United States Patent [19]
Yukawa et al.

[11] Patent Number: 4,651,446
[45] Date of Patent: Mar. 24, 1987

[54] ELECTRONIC PEDOMETER

[75] Inventors: Kazuhiko Yukawa, Katano; Isao Tasaka; Yukio Yamamura, both of Hikone, all of Japan

[73] Assignee: Matsushita Electric Works, Ltd., Kadoma, Japan

[21] Appl. No.: 685,519

[22] Filed: Dec. 24, 1984

[30] Foreign Application Priority Data

Mar. 24, 1984 [JP] Japan ................. 59-57029

[51] Int. Cl.$^4$ .............................................. A43B 5/00
[52] U.S. Cl. ........................................ 36/132; 36/136; 235/105
[58] Field of Search ............. 36/132, 136, 137; 377/3; 235/105, 99 R, 1 R

[56] References Cited

U.S. PATENT DOCUMENTS

| | | | |
|---|---|---|---|
| 3,580,083 | 5/1971 | Wu | 235/1 R |
| 4,019,030 | 4/1977 | Tamiz | 235/105 |
| 4,053,755 | 10/1977 | Sherrell | 235/105 |
| 4,175,446 | 11/1979 | Crowninshield | 235/105 |
| 4,220,996 | 9/1980 | Searcy | 235/105 |
| 4,371,945 | 2/1983 | Karrl et al. | 235/105 |
| 4,402,147 | 9/1983 | Wu | 36/136 |
| 4,510,704 | 4/1985 | Johnson | 36/136 |
| 4,571,680 | 2/1986 | Wu | 235/105 |

FOREIGN PATENT DOCUMENTS

| | | | |
|---|---|---|---|
| 119009 | 9/1984 | European Pat. Off. | 235/105 |
| 212583 | 8/1984 | Fed. Rep. of Germany | 235/105 |
| 56-153812 | 11/1981 | Japan . | |
| 57-49134 | 10/1982 | Japan . | |
| 2121219 | 12/1983 | United Kingdom | 36/136 |

OTHER PUBLICATIONS

The Washington Post "Yup! the Computer Shoe", N. Hyde 3-7-1985.
Washington Post, article of 3/7/85, "Sneak Peeks" and Yup! the Computer Shoe.

Primary Examiner—Werner H. Schroeder
Assistant Examiner—Mary A. Ellis
Attorney, Agent, or Firm—Armstrong, Nikaido, Marmelstein & Kubovcik

[57] ABSTRACT

An electronic pedometer for use on a footwear is disclosed. The pedometer comprises a step sensor and an electric counter connected thereto, both mounted on the instep of the footwear. The step sensor senses a flexing motion that the instep of the footwear undergoes each time of the user just kicks the ground with the footwear and provides upon sensing such motion an output indicative of each step taken by the user. An electronic counter has therein electric components forming a computing circuit which receives the outputs from the sensor to compute based thereupon the number of steps taken and the distance covered, the resulting measurements being visually indicated on a display section of the counter. The sensor and the counter is connected by means of a resilient band by the utilization of which they are secured or mounted on the instep of the footwear. The provision of the sensor sensing the flexing motion of the instep for counting the steps makes it possible to assemble the sensor and the counter into a compact unit, which can be unobtrusively mounted on the instep of a normal footwear without resorting to any modification thereof and can be readily handled as a single unit.

3 Claims, 23 Drawing Figures

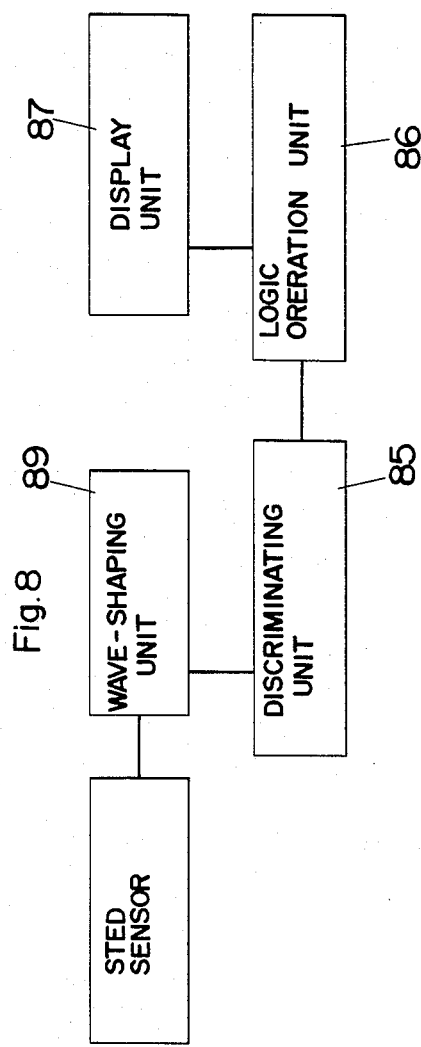
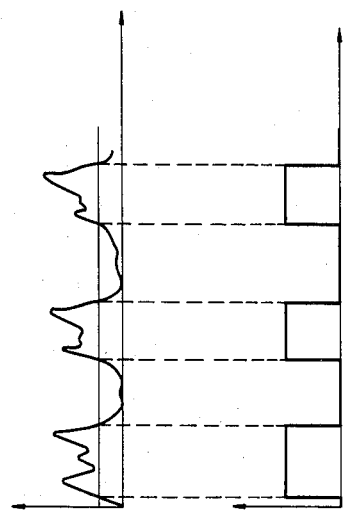
Fig. 8
Fig. 9A
Fig. 9B

ELECTRONIC PEDOMETER

BACKGROUND OF THE INVENTION

1. Field of the Invention

The present invention is directed to an electronic pedometer, and more particularly to an electronic pedometer adapted to be fitted on a footwear.

2. Information Disclosure Statement

Electronic pedometers adapted on a footwear are known, for example, as disclosed in Japanese utility model publication (KOKOKU) of the application No. 57-49134 published on Oct. 27, 1982 and Japanese utility model early publication (KOKAI) of the application No. 56-153812 published on Nov. 17, 1981. The former publication discloses a shoe with an electronic pedometer which is composed of a strain transducer or piezoelectric element utilized as a step sensor which produces an output in response to each step taken by the user and a counter receiving the outputs of the transducer for incrementally count the number of steps taken by the user. The counter is mounted on the instep of the shoe so that the display section can be readily viewed by the user walking or running, while the sensor is located in the sole of the shoe so that it can be effectively strained in response to steps taken by the user for sensing the steps. The step sensor thus located at a position remote from the counter inevitably necessitates a wiring of considerable length for electrical connection therebetween. However, such wiring extending from the sensor in the sole to the counter on the instep can be hardly accepted in a normal shoe without modifying it. And even if the wiring is successfully received in the shoe, it would certainly detract from the comfortable fitness of the foot. Further, the wiring extending around the portion of the shoe can naturally be subject to a continuous stress while walking or running, so that it has a potential hazard of being damaged or cut through the repeated use of the shoe. These disadvantage associated with the above prior art pedometer results in less practical utility of the pedometer on the shoe. The later publication discloses the like construction except that the transducer is located on the insole of the shoe at the heel thereof and is electrically connected through wires to the counter secured on the instep thereof by means of a strap. Also in this prior pedometer, the same disadvantages remain and the user will suffer inconvenience of arranging the wiring inside the shoe. In addition, the above construction in which the counter is separated from the sensor will annoy the user in his or her operation of demounting and remounting the pedometer before and after the washing of the shoe. Accordingly, it is desired to provide an electric pedometer compact enough such that the counter and the sensor thereof are together mounted on the instep of a shoe or the like footwear.

SUMMARY OF THE INVENTION

The present invention has been accomplished in view of the above and achieved by utilizing motions and forces acting upon the instep of a footwear during the walking and running process for counting the steps of the user. That is, the instep of the footwear undergoes a flexing or bending motion each time the user just kicks the ground. Such motion or force is integral to the walking or running process with the footwear and is well representative of each step taken by the user. By utilization of the above characteristic behavior, the present invention can provide an improved feature for successfully mounting a step sensor and an electric counter coupled thereto for visual indication of the sensed results together on the instep of the footwear. The step sensor is for sensing the flexing motion of the instep of the footwear so as to provide an output indicative of that motion which is indicative of each step taken by the user. Also provided is support means which carries the step sensor and by which the sensor is mounted on the instep. The electronic counter is also held by said support means so as to be mounted on the instep together with the sensor. Included in the electronic counter are electronic components forming a computing circuit which is electrically connected to the sensor for receiving the outputs therefrom so as to compute the number of steps taken and the distance covered. The resulting measurements are visually indicated on a display section provided on the counter. With this arrangement of mounting the sensor and the counter together on the instep of the footwear, they can be assembled into a compact unit which has no part substantially extending into the interior of the footwear, thus enabling the pedometer to be mounted on the footwear without impairing the comfortableness thereof and without requiring any modification on a normal or existing footwear, such modification might be required if the sensor be mounted in the heel or other portion in the outsole of the footwear. In addition to the above, the above structure allows the pedometer to be readily handled as one integral unit in the case of demounting or remounting it as required before and after the washing of the footwear.

Accordingly, it is a primary object of the present invention to provide an electronic pedometer which is made compact to be unobtrusively mounted on an existing footwear and is easily handled to be demounted as well as remounted.

In a preferred embodiment, the step sensor is in the form of a normally open switch comprising a spring contact movably held in relation to a fixed contact. The spring contact is arranged to move against its biasing force into contacting or closed relation to the fixed contact when subjected to a force applied thereto at each time of said flexing motion or at each time the user kicks the ground. After kicking the ground, the instep is stretched to return its normal state of being flattened or even so that the contact spring returns by its biasing force to an initial position where it is disengaged from the fixed contact to open the switch. In this manner, the switch repeats the closing and opening operations in response to the steps taken by the user so as to accurately provide outputs indicative of actual steps. The above switch is received within a resilient band which is connected to the casing of the counter. The resilient band extends along the lengthwise direction of the instep and is capable of deforming in conformity to the above flexing motion of the instep such that the sensor received within the resilient band can be properly positioned on the instep and accurately actuated for detection of each step taken by the user. Said resilient band can be readily secured to the instep by being fastened to the shoelace at the instep, thus providing by itself said support means by which the sensor and the counter are together mounted on the instep.

It is therefore another object of the present invention to provide an electronic pedometer of which sensor can be properly located on the instep for correctly sensing the flexing motion of the instep as indicating each step taken by the user.

In another preferred embodiment, a strain transducer or piezoelectric element is employed as the step sensor which provides an output indicative of each step by being subjected to a strain due to said flexing motion of the instep. The strain transducer is mounted within the like resilient band as the above to be properly positioned on the instep for being effectively deformed in an exact corresponding manner to the flexing motion of the instep during the walking or running, which is therefore a further object of the present invention.

Said resilient band is particularly advantageous for use on the footwear having the shoelace at the instep since it can be readily fixed on the instep by being fastened to the shoelace. For more secure fastening of the resilient band to the instep, the resilient band is formed with mating means by which the band is fixedly fastened to the shoelace. Included in the mating means are a series of recesses or eyelets formed along the periphery of the band through which the shoelace extends in engaging relation thereto and a generally U-shaped hook formed at one end of the band for catching the shoelace. In another version, a belt is added to the counter to be fastened around the ankle of the user for further increasing the secure positioning of the counter and the resilient band on the instep.

These and other objects and advantages of the present invention will be apparent from the following description of the preferred embodiments when taken in conjunction with attached drawings.

BRIEF DESCRIPTION OF THE DRAWINGS

FIG. 8 is a block diagram schematically illustrating the operation of the above pedometer;

FIGS. 9A and 9B are waveform charts respectively showing the waveform of the output directly from the sensor and that after being processed by an wave shaping circuit;

DESCRIPTION OF THE PREFERRED EMBODIMENTS

Figure 1:
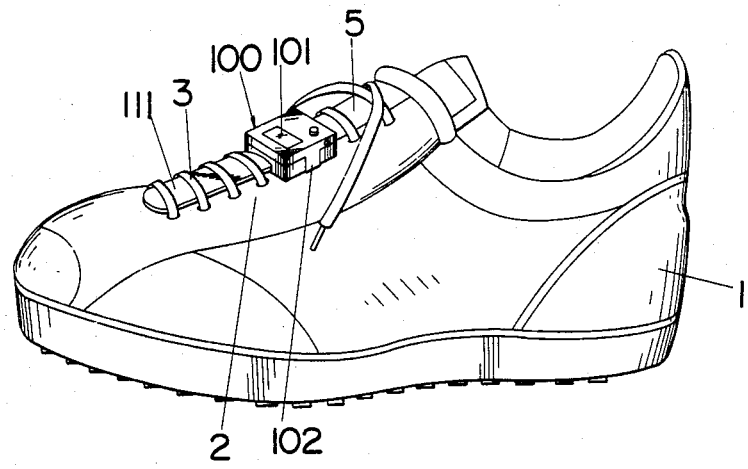
FIG. 1 is a perspective view of an electronic pedometer as attached to a shoe in accordance with a first preferred embodiment of the present invention.
Figure 2:
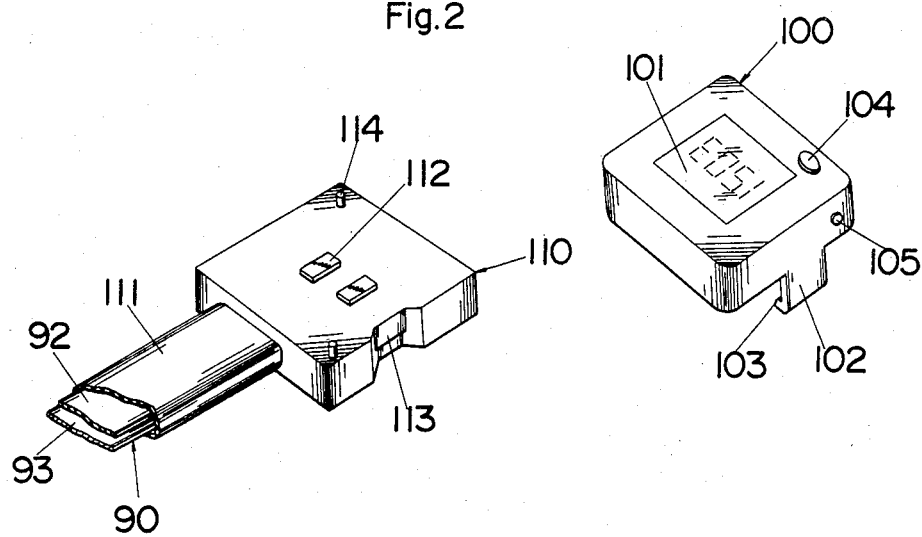
FIG. 2 is a perspective view of the above pedometer with a counter detached from a complementary mount base.

First embodiment <FIGS. 1 to 3>

Referring now to FIG. 1, there is disclosed an electronic pedometer adapted for use on a footwear in accordance with a first preferred embodiment of the present invention. In the present and the other embodiments hereinafter described, the pedometers are designed to be fitted on a sneaker 1 or the like running shoe having a shoelace 3 on the instep 2 thereof. As shown in FIG. 2, the pedometer of the present embodiment comprises a step sensor 90, an electronic counter 100 electrically connected thereto, and a mount base 110 on which the counter 100 is detachably mounted. Extending forwardly from the mount base 110 is a resilient band 111 which encloses therein said step sensor 90. The resilient band 111 is firmly connected at its rear end to the mount base 110 and is in use to be inserted between the shoelace 3 and the tongue 5 at the instep 2 of the shoe 1 so as to be secured in place on the instep 2, thus providing means by which the counter 100 and the sensor 90 is fixed together on the instep 2.

Figure 3A:
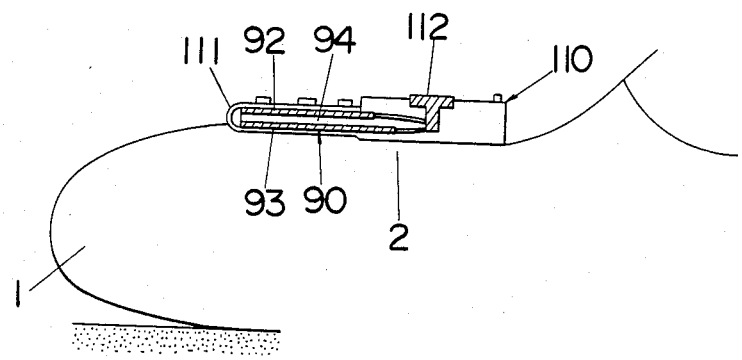
FIGS. 3A and 3B are respectively explanatory views showing how a step sensor employed in the above pedometer is actuated at each step of the user.
Figure 3B:
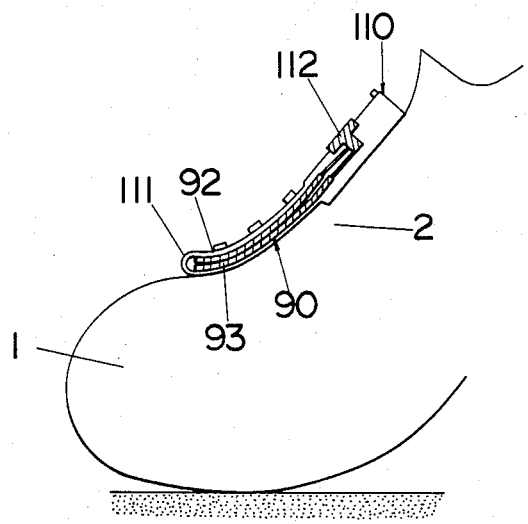

The reference upon which the sensor 90 of the present invention relies for sensing each step is a flexing motion that the instep 2 of the shoe 1 suffers each time the user just kicks the ground. For this purpose, said resilient band 111 is made by a suitable resilient material to be capable of deforming in conformity to the flexing motion of the instep 2 such that the sensor 90 in the resilient band 111 can sense the flexing motion as indicating each step taken by the user. The sensor 90 enclosed in the band 111 is a normally open switch comprising a pair of contact leaves 92 and 93 which are elongated in the longitudinal direction of the band 111 and are electrically connected internally to a first terminal 112 on the mount base 110. By means of this first terminal 112 arranged to be in electrical connection with a second terminal (not shown) on the bottom of the counter 100, the switch or sensor 90 is electrically connected to a circuit of the counter 100. These contact leaves 92 and 93 are spaced by a small gap 94 which keeps them separated from one another when the instep 2 of the shoe 1 is in the normal condition of being flattened, as shown in FIG. 3A. When the user kicks the ground with one's foot wearing the shoe 1 on which the pedometer is fitted, the resilient band 111 is flexed or bent together with the instep 2 of the shoe 1, as shown in FIG. 3B, the contact leaves 92 and 93 are forced to be in contact engagement to thereby close the switch momentarily. After the user kicks the ground to have one's foot off the ground, the resilient band 111 together with the instep 2 returns to be flattened for opening the switch and this lasts until the user again kicks the ground by the same foot. In this way, the switch or sensor 90 produces an output correctly indicative of each step that the user takes and sends it to the counter 100 where it is processed to provide the number of steps taken and the distance covered, the resulting measurements being indicated on a LCD-made display section 101 of the counter 100.

Depending from the casing of the counter 100 is a latch arm 102 which snaps into a notch 113 in the side of the base 110 with a projection 103 engaging the lower edge of the notch 113, whereby the counter 100 is detachably mounted on the mount base 110. A pair of studs 114 on the mount base 110 fit into corresponding holes in the bottom of the counter 100 for position-correct mounting of the counter 100 on the base 110.

Said electronic counter 100 incorporates within the casing thereof various electronic components forming a computing circuit which receives the outputs from the sensor 90 to compute based thereupon the number of steps taken and the distance covered by the user and as well forming said display section 101 visually indicating the resulting measurements, or selectively indicating the number of steps or the distance covered. Also incorporated in the counter 100 is a so-called button battery (not shown) powering the computing circuit and the display section 101. Included in the electronic components is an one-chip microcomputer executing necessary operations in accordance with a program stored therein. The above microcomputer is programmed to count the number of steps from the outputs of the sensor 90, to multiply the total number of steps by a constant representative of twice the step-length of a particular user for giving the total distance covered, and to count the time elapsed in the course of walking or running by the user. The resulting measurements of the above operations by the microcomputer are selectively indicated on the display section 101. For selection among the above modes and for setting of the data or constant to be entered for representing the step-length of the particular user and the present time, the counter 100 is provided with buttons only two of which are indicated at 104 and 105.

When the shoe 1 requires to be washed after a number of repeated use, the counter 100 including the electrical components can be alone removed from the mount base 110 or the shoe 1 for protecting the electronic components from being damaged during the washing, while leaving the mount base 110 and the sensor 90 to remain attached to the shoe 1 and therefore without requiring annoyance procedure of unfastening the mount base 110 from the instep 2 to which it is fastened by the use of the shoelace 3.

Figure 4:
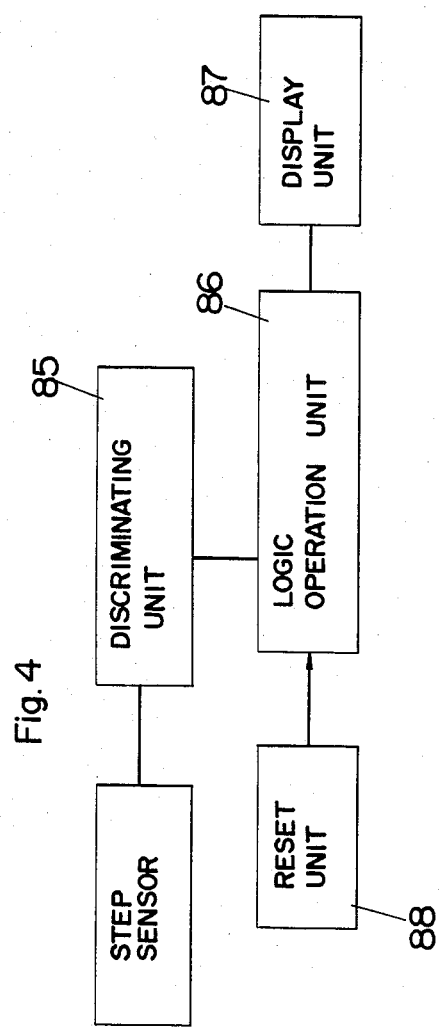
FIG. 4 is a block diagram schematically illustrating the operation of the above pedometer.
Figure 5:
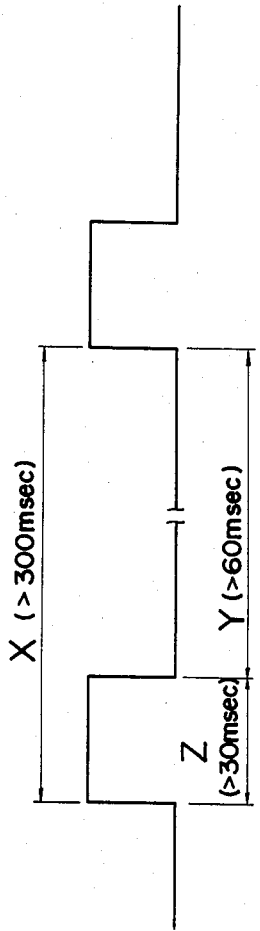
FIG. 5 is a waveform chart illustrating a particular waveform seen in an computing circuit of the above pedometer.
Figure 6:
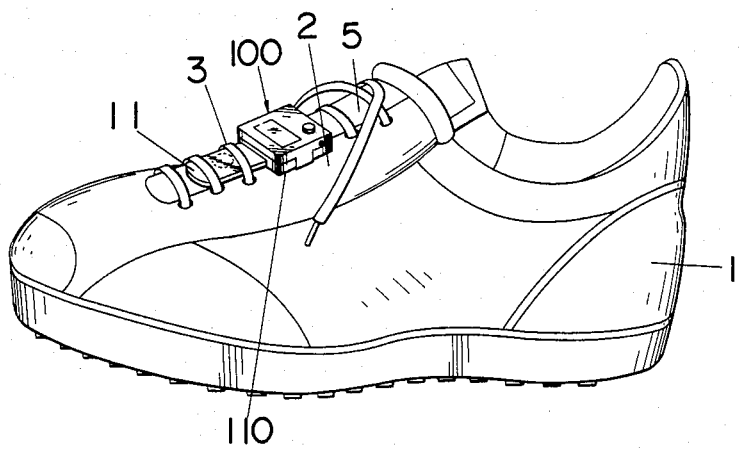
FIG. 6 is a perspective view of an electronic pedometer as attached to a shoe in accordance with a second embodiment of the present invention.
Figure 7:
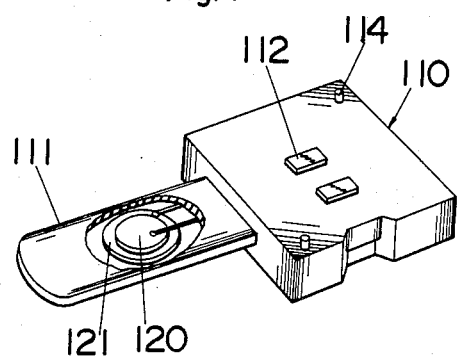
FIG. 7 is a perspective view partly in cutaway of a mount base with a step sensor employed in the above pedometer.

FIG. 4 shows in greatly schematic representation a functional block diagram of the electronic counter common to all the embodiments described herein. The output from the step sensor is fed through a discriminating unit 85 to a logical operation unit 86 where they are processed to give the number of steps taken and the total distance travelled, while the logical operation unit 86 controls a display unit 87 to selectively give the incremental indication of the number of steps or the distance in accordance with the instruction entered by the user. A reset unit 88 is coupled to the logical operation unit 86 for giving the instruction of clearing the indication at the display unit 87. Said discrimination unit 85 is so designed as to ignore possible noises or irregular pulses emanating from the chattering of the contacts in the sensor, a jamming radio source, or any other unknown cause for passing only the valid outputs indicative of the actual steps to the logical operation unit 86. For this purpose, the discrimination unit 85 is arranged to recognize the outputs fed from the sensor as valid outputs indicative of actual steps only when the following three requirements are satisfied. The first requirement is that the interval X, as shown in FIG. 5, between the rise times of the output and the succeeding output should be more than 200 msec. The second requirement is that the off-time interval Y between the adjacent outputs should be more than 60 msec, and the third requirement is that the on-time interval Z of the particular output exceeds more than 30 msec. The above values are decided empirically with due consideration to the behavior of the walking and running processes by the human, and are well distinctive of the actual step from possible noises or the like, whereby the counter of the present invention can accurately count the number of actual steps and the exact distance travelled. In fact, even in the case of spot-running which is thought to exhibit a minimum time interval or to be done at a cycle of minimum time among all the modes of walking and running, the runner cannot haVe his foot touching at the time interval of not sooner than 200 msec, for example.

Second embodiment <FIGS. 6 to 9>

The pedometer in this embodiment is similar to the above first embodiment except that a step sensor 120 is made of strain transducer or piezoelectric element. The like numerals as in the first embodiment are used to indicate the like parts of the present embodiment. Said sensor or piezoelectric element 120 employed is a disc-shaped one molded in the resilient band 111 with a circular electrode plate 121 attached to the lower faces thereof. A pair of lead wires connecting the sensor 120 internally to the first terminal 112 on the mount base 110 with the respective ends of the wires soldered to the upper face of the piezoelectric element 120 and the electrode plate 121 at longitudinally and laterally spaced points for preventing the breakage of the soldering connection against the flexing motion of the resilient band 111. Each time the instep 2 of the shoe 1 undergoes said flexing motion in response to the user's foot kicking the ground, the piezoelectric element 130 is strained to deform a certain amount, producing across the element 120 a corresponding voltage variation which is recognized by the electronic circuit in the counter 100 as the output from the element or sensor 120 indicating the step taken by the user.

As shown in FIG. 8, which is the functional block diagram of the counter 100 in a greatly schematic representation, a wave-shaping unit 89 is added to the circuit of the counter 100 for modifying the output of complicated waveform, shown in FIG. 9A, into regularly shaped pulse. The resulting pulse is then fed to the discrimination unit 85 where it is judged whether or not the voltage level thereof is higher enough to be well indicative of the actual step. If the level is enough for indicating the actual step, a signal is fed from the discrimination unit 85 to the logic operation unit 86 where it is processed to give the number of steps taken and the distance covered based upon the number of steps and a constant entered to indicate the step-length of the particular user, the resulting measurements being sent to the display unit 87 for visual indication thereof on the LCD-made display section 101 of the counter 100.

Figure 10:
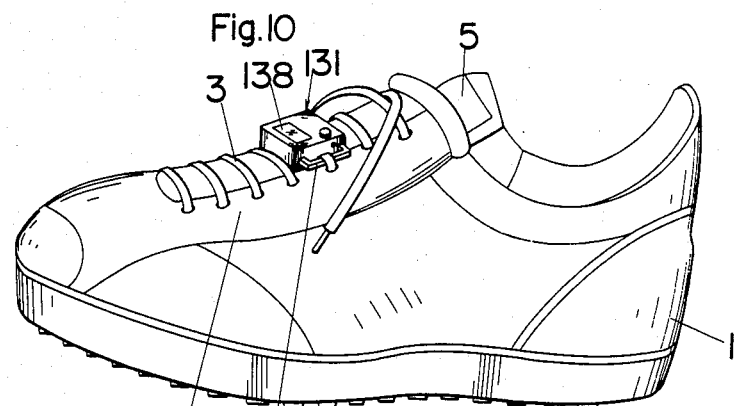
FIG. 10 is a perspective view of an electric pedometer as attached to a shoe in accordance with a third embodiment of the present invention.
Figure 11:
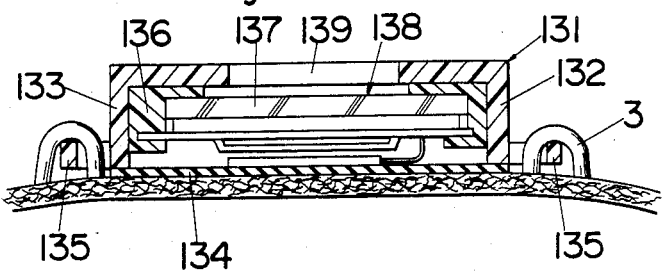
FIG. 11 is a longitudinal section of the above pedometer.
Figure 12:
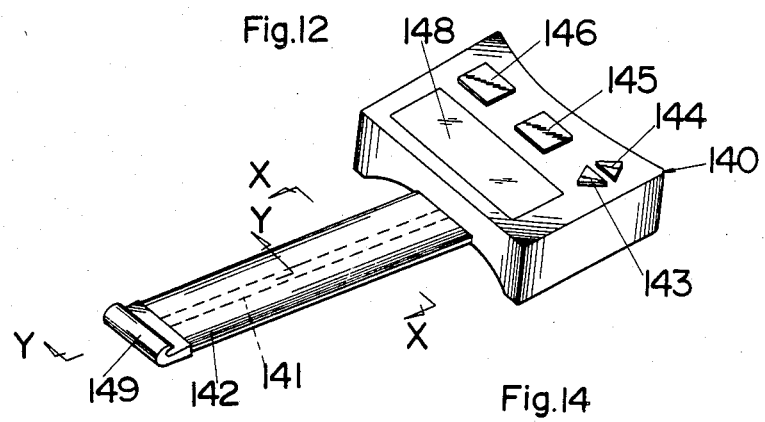
FIG. 12 is a perspective view of an electric pedometer as attached to a shoe in accordance with a fourth embodiment of the present invention.
Figures 13, 14:
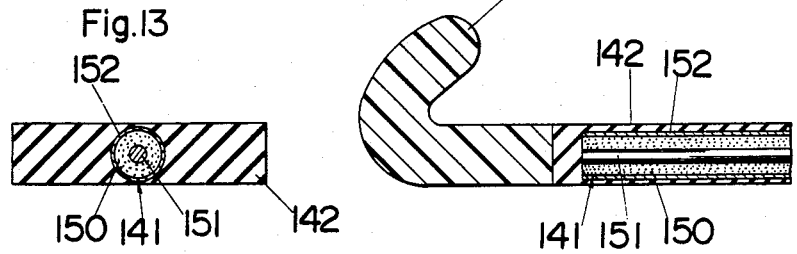
FIG. 13 is a cross section taken along line X—X of FIG. 12.
FIG. 14 is a cross section taken along line Y—Y of FIG. 12.

<Third embodiment FIGS. 10 and 11>

In this embodiment, a step sensor 130 is received within the casing 132 of an electronic counter 131 to be mounted on the instep 2 of the shoe 1. The casing 132 includes an upper case 133 having a bottom opening closed by a resilient layer 134 made of a rubber or the like elastic material adhered at its periphery to the lower edge of the upper case 133 and carrying thereon the step sensor 130 of the strain transducer or piezoelectric element as employed in the second embodiment. The resilient layer 134 fits on the instep 2 of the shoe 1 in close contacting engagement therewith when the counter 130 is mounted thereon, such that the resilient layer 134 conforms to the flexing motion of the instep 2 of the shoe 1 each time the user kicks the ground with one's foot wearing the shoe 1, causing the sensor 130 to deform a corresponding amount for sensing the flexing motion of the instep and providing an output as indicating each step taken by the user. The casing 132 holding said resilient layer 134 and the sensor 130 is provided at the opposite sides of the upper case 133 respectively with integral buckles 135 through which the shoelace 3 extends for fastening the pedometer on the instep 2. An internal frame 136 is fitted within the upper case 133 to support electronic components forming an electronic circuit which receives the outputs from the sensor 130 for calculating the number of steps and the distance covered based thereupon, said electronic components including a battery and an one-chip microcomputer in addition to a LCD 137 defining a display section 138 on which the value for the number of steps or the distance are selectively indicated. The display section 138 is viewed through a window 139 in the upper wall of the casing 132.

Fourth embodiment <FIGS. 12 to 15>

Figure 15A:
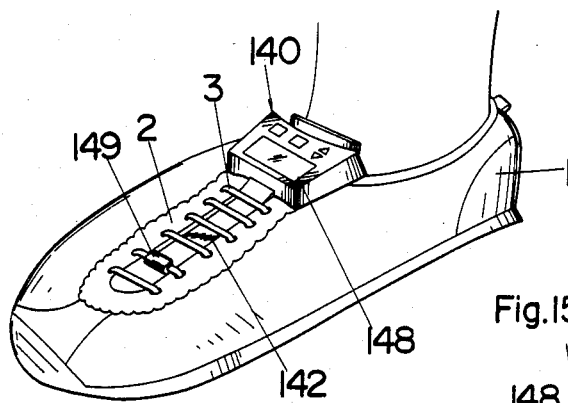
FIGS. 15A and 15B are respectively perspective views explaining the flexing motion of the instep of the shoe associated with the striding motion of the foot.
Figure 15B:
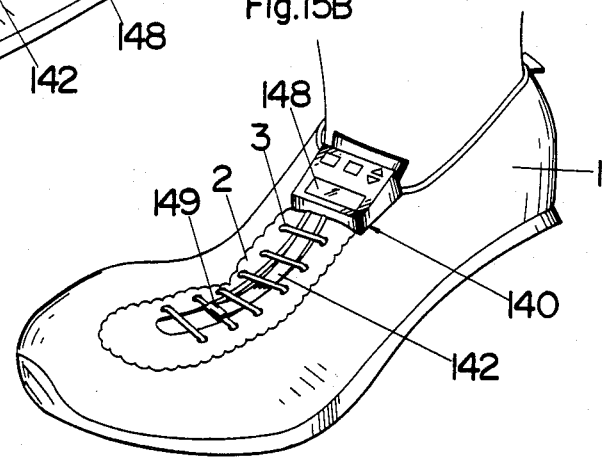

In this embodiment, an electronic counter 140 has a casing from which a resilient band 142 extends forwardly to enclose therein a step sensor 141. The operations of the counter 140 and the sensor 141 are the same as in the second embodiment, and mode selection among the different functions of the counter 140 is made by manipulating buttons 143 to 146 on the upper face of the counter 140. The resilient band 142 is an elongated flat sheet made of a rubber or the like elastic material having one longitudinal end firmly connected to the casing of the counter 140 so that it is mounted on the instep 2 of the shoe 1 together with the counter 140. That is, the resilient band 142 is inserted likewise in the second embodiment between the shoelace 3 and the tongue 5 at the insole 2 so that it is secured on the instep 2 as extending along the lengthwise direction of the instep 2 and deforms in conformity with the flexing motion of the instep 2 at each time of the foot of the user kicking the ground, as shown in FIG. 15B.

The sensor 141 mounted within the resilient band 142 comprises a piezoelectric element 150 in the form of a rod extending along the substantial length of the band 142, a core electrode 151 extending through the element 150, and a sleeve electrode 152 covering the element 150, these electrodes being electrically connected to the circuit of the counter 140 for sending the outputs of the element 150 thereto. The sensor 141 thus constructed is subjected to the flexing motion of the resilient band 142 or the instep 2 shown in FIG. 15B so that it is strained in response thereto for providing an output indicative of each step that the foot wearing the shoe 1 takes, just in the same way as in the previous embodiments. The outputs from the sensor 141 are processed in the circuit of the counter 140 to selectively give the indication of the total number of steps taken or the distance covered on a LCD-made display section 148 of the counter 140. Another indication of elapsed time for walking or running can also be given on the display section 148 by manipulating one of the buttons 143 to 146. A hook 149 of rather hard plastic material is integrally connected to the forward end of the resilient band 142 to be engaged with the shoelace 2, as shown in FIG. 15A, enhancing the secure mounting of the pedometer on the instep 2 of the shoe 1.

Figure 16:
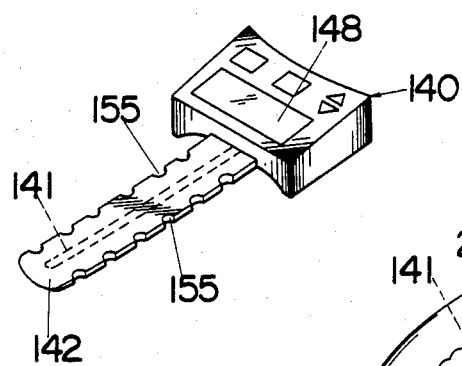
FIG. 16 is a perspective view showing a modification of the pedometer of FIG. 12.
Figure 17:
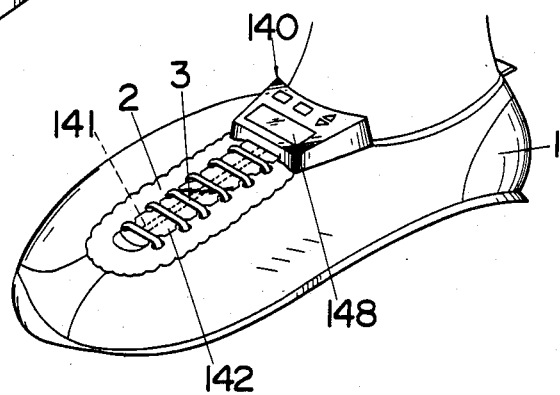
FIG. 17 is a perspective view of the pedometer of FIG. 16 as attached to a shoe.

Referring to FIGS. 16 and 17, there is disclosed a modification of the above fourth embodiment which is similar to the embodiment except that the resilient band 142 has a series of recesses or eyelets 155 formed in lateral sides thereof, these eyelets 155 receiving the segments of the shoelace 3 to be engaged therewith for more secure positioning of the resilient band 142 and the counter 140 connected thereto.

Figure 18:
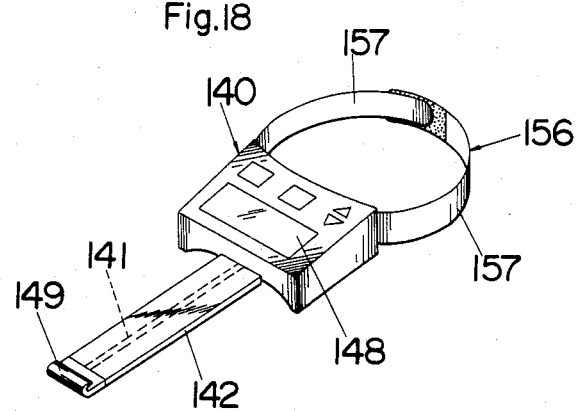
FIG. 18 is a perspective view showing another modification of FIG. 12.
Figure 19:
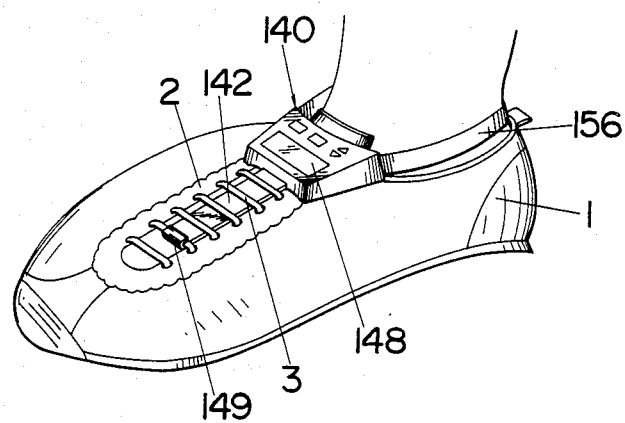
FIG. 19 is a perspective view of the pedometer of FIG. 18 as attached to a shoe.

Another modification of the above fourth embodiment is shown in FIGS. 18 and 19, wherein the counter 140 is provided with a belt 156 which is fastened around the ankle of the user for providing more stable mounting of the pedometer on the instep 2 of the shoe 1. The band 156 comprises a pair of straps 157 extending from the rear of the counter 140 to have the free ends detachably engaged by means of so-called velcro fastener.

Figure 20:
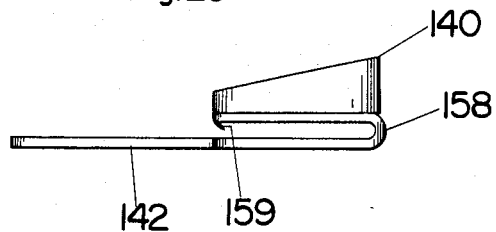
FIG. 20 is a partial view of a further modification of FIG. 12.

FIG. 20 illustrates a further modification of the fourth embodiment wherein the counter 140 and the resilient band 142 is connected by means of a generally U-shaped member 158 of plastic material through the inside of which lead wires (not shown) extend for electrical connection between the sensor and the circuit of the counter 140. The U-shaped member 158 comprises two substantially parallel legs spaced one above the other, the upper legs carrying thereon the counter 140 and the lower legs being connected to the resilient band 142 in the same horizontal plane thereof. These legs are connected by a web to define therebetween a narrow space into which the shoelace 3 at the rear end of the instep 2 is engagingly inserted. That is, the U-shaped member 158 provides a rear clip engaging the shoelace 3 at the rear end of the instep 2 to thereby give more stable mounting of the pedometer on the instep 2 of the shoe 1. The upper leg has at its front edge a barb 159 for engagement with the shoelace 3.

What is claimed is:

1. An electronic pedometer adapted to be fitted on a footwear having an instep which comprises:
    a step sensor removably mountable on the instep of the footwear for sensing the flexing motion of the instep associated with each step that the user takes with his foot wearing the footwear during the walking or running motion so as to provide an output indicative of each step;
    support means which carries said step sensor and by which the sensor is removably mounted on the instep of the footwear, and
    an electronic counter held by said support means to be mounted on the instep together with said sensor as a single removable unit, said counter including electric components forming a computing circuit which is electrically connected to the sensor for receiving the outputs therefrom so as to compute based upon the outputs the number of steps taken and the distance covered, and said counter including a display section indicating the resulting measurements.

2. The electronic pedometer as set forth in claim 1, wherein said step sensor is in the form of a normally open switch comprising a spring contact movably held in relation to a fixed contact, said spring contact being arranged to move against its biasing force into contacting or closed relation to the fixed contact when subjected to such a force as applied thereto at each time of said flexing motion of the instep.

3. The electronic pedometer as set forth in claim 1, wherein said support means is a resilient band within which said step sensor is mounted and which extends along the lengthwise direction of the instep, said resilient band capable of being deformed in conformity to the flexing motion of the instep such that the step sensor senses the flexing motion of the instep to provide the output indicative of each step.

* * * * *